Figures 5, 6:
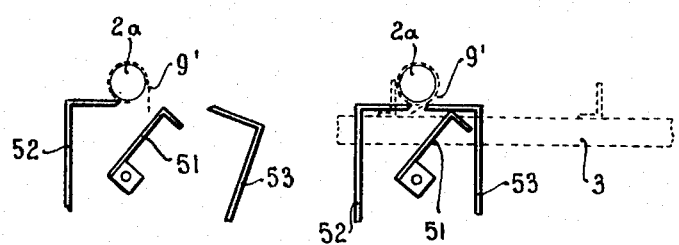

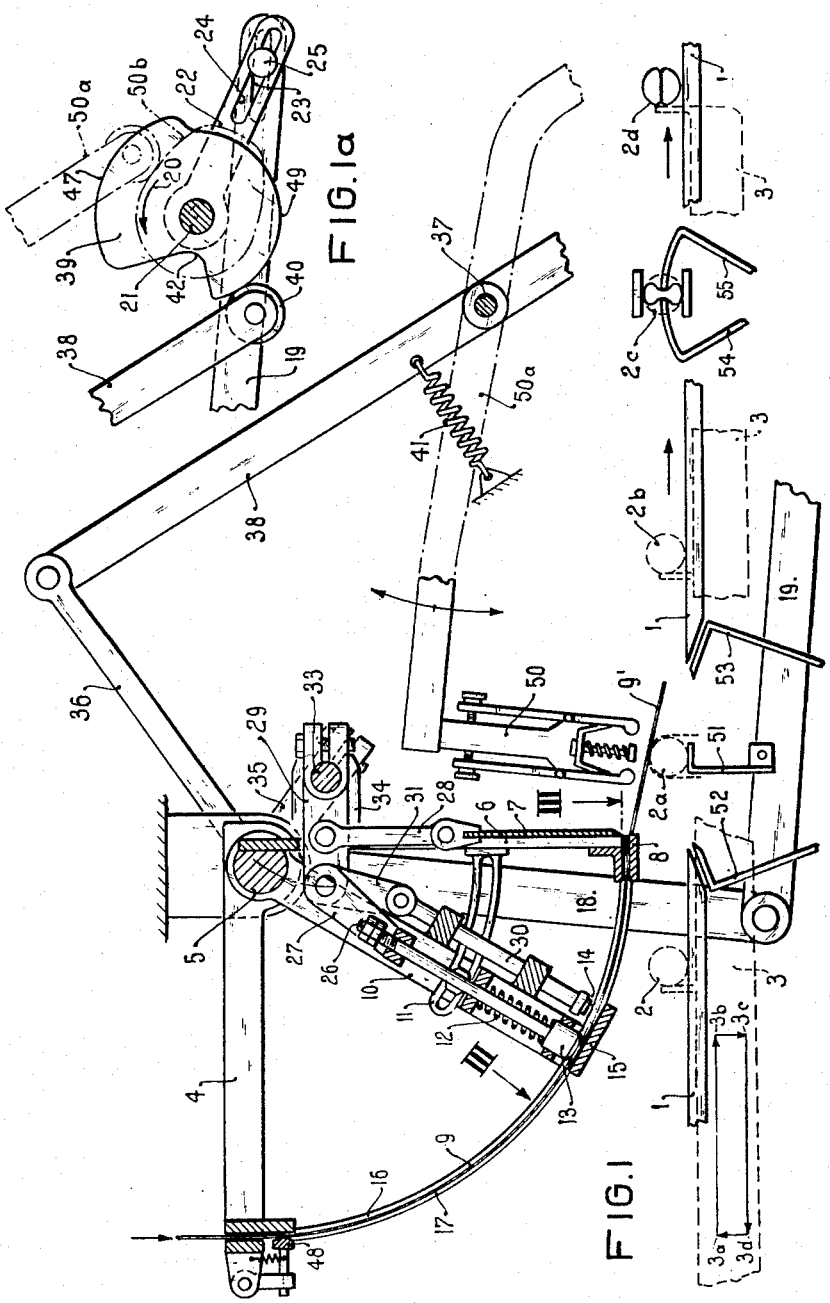

Dec. 24, 1957 J. T. VERHAPPEN ET AL 2,817,402
CUTTING DEVICE FOR WRAPPING MACHINES
Filed July 20, 1954 3 Sheets-Sheet 2
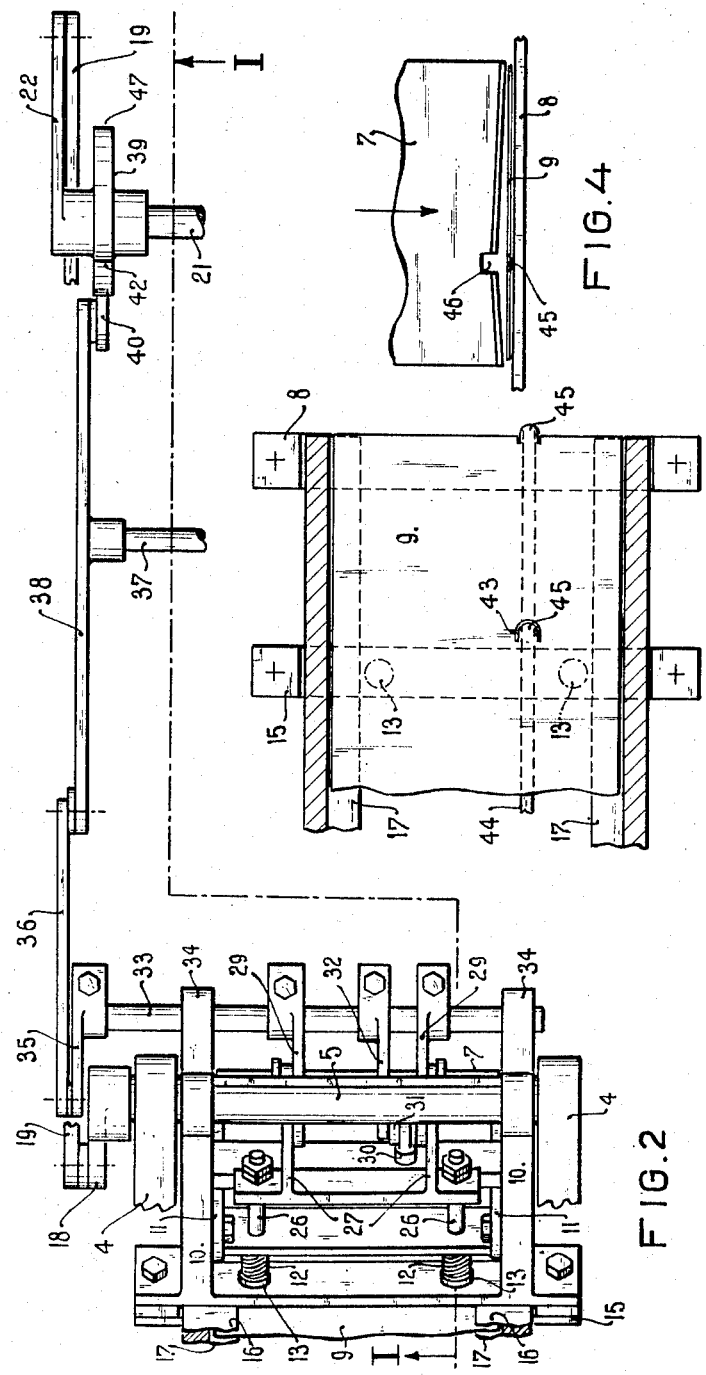

Dec. 24, 1957   J. T. VERHAPPEN ET AL   2,817,402
CUTTING DEVICE FOR WRAPPING MACHINES
Filed July 20, 1954   3 Sheets-Sheet 3

United States Patent Office 2,817,402
Patented Dec. 24, 1957

2,817,402
CUTTING DEVICE FOR WRAPPING MACHINES

Jacobus T. Verhappen, Henricus J. Maas, and Martinus Verbakel, Eindhoven, Netherlands, assignors to N. V. Vereenigde Tabaksindustrieen Mignot & De Block, Eindhoven, Netherlands Application July 20, 1954, Serial No. 444,554

Claims priority, application Netherlands August 10, 1953

6 Claims. (Cl. 164—14)

The invention relates to a machine for wrapping a sheet of packing material, e. g. cellophane, around an article, particularly a rod-shaped article, such as a cigar, a cotton-bobbin, medicine-tube, etc. The machine comprises a device for the stepwise supply of a web of packing material, means for periodically cutting off a piece of predetermined length from said web to obtain sheets of predetermined size, a wrapping-mechanism for periodically wrapping a sheet cut from said web around an article and a conveying-device adapted to move an article, which has just been wrapped in a sheet, out of reach and to move the next article to be wrapped in a sheet within reach of said wrapping-mechanism.

The invention has for its object to provide a machine of this kind, which in comparison with known machines has a simple construction and makes adjustment in according with the dimensions of the articles to be wrapped readily possible. In the machine, the supply-device and the cutting-means are mounted for angular reciprocation about a common axis, the gripping members of the supply-device and the cutting zone lying between the cutting means are adapted to be moved along a cylindrical surface, which is concentric to said axis, and the web of packing material is supplied along said cylindrical surface. The angularly reciprocating movement of the supply-device and the cutting means makes a simple construction and an easy control of the machine possible. Angularly reciprocating means are guided in a simpler way than transversely moving parts. If the angular stroke of the reciprocating system which form a unit and consist of the supply-device and the cutting means are made adjustable, sheets of various breadths may be cut from the web of packing material. A very simple adjustable driving mechanism is obtained, if a radially extending arm is attached to the shaft of the angular reciprocating unit and said arm is coupled by a rod of adjustable length with a radially adjustable crank-pin of a crank-shaft driven in one direction.

It is possible to combine the driving mechanism of the gripping members of the supply device and the knife of the cutting means when said gripping members and said knife are connected to a multiple lever system, which is swingably attached to the angularly reciprocating unit, and when the driving arm of said lever system is connected to a rod-mechanism at a point adapted to describe about the axis of rotation of said lever system a part of a circle containing the axis of angular reciprocation of said unit, said rod-mechanism being driven by means of a cam-disc mounted on the main shaft, e. g. the crankshaft, of the machine.

The machine according to the invention is very suitable for packing machines, in which at the same time a sheet of packing material and a tearing tape for tearing open the wrapper along a predetermined line are wrapped around an article. Especially for cellophane wrappers such a tearing tape is of great efficiency. In order to facilitate the removal of the wrapper the tearing tape will have to protrude with a lip from the edge of the wrapper.

To this end it is recommended according to the invention to provide the angularly reciprocating unit consisting of the supply-device and the cutting means with a movable cutting die adapted to make a U-shaped cut in the web of packing material. The legs of said U-shaped cut must then extend on both side edges of the tearing tape and the bend of said U must be turned towards the free end of the web of packing material. The U-shaped cut will have to be made at a distance from said free end of the packing material at a point, which is crossed by the knife of the cutting means after the packing material has been shifted one step. In order to prevent the lip formed by the U-shaped cut to be cut-off by the knife, the latter must have a recess in its edge at the point engaging said tearing tape.

Advantageously the cutting die is adjustably mounted, in such a manner, that it is capable of being angularly displaced through a part of a circle about the axis of reciprocation of the angularly reciprocating unit with respect to the means for cutting the sheet from the web of packing material. This makes it possible to adjust the position of the protruding lip carrying the end of the tearing tape in correspondence with the breadth of the sheet to be cut from the web of packing material.

Figure 7:
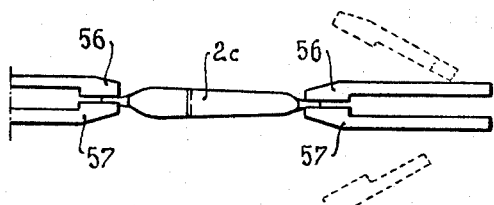
Figure 8:
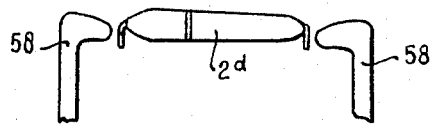

These and other features of the invention will be elucidated with the aid of the accompanying drawing which only diagrammatically illustrates the parts of a machine for wrapping cigars in cellophane which are essential for the understanding of the invention. In the drawing:

Figs. 1 and 1a provide a sectional view on the line I—I in Fig. 2 of the main parts of said machine, Fig. 2 is a plan view of the most important parts of the device according to Fig. 1, Fig. 3 is a sectional view on line III—III in Fig. 1, Fig. 4 is an elevational view of the cutting means of said machine, Figs. 5 and 6 are diagrams of different positions of the parts of the wrapping mechanism, Fig. 7 is a diagram of the members for squeezing and adhering the ends of the wrapper, and Fig. 8 is a diagram of the members for folding back the flattened ends of the wrapper and adhering said ends to the sides of the wrapper.

In the drawing (Fig. 1) the reference numeral 1 designates a table, on which cigars 2 are moved stepwise and at predetermined distances from one another by means of a conveying device 3. This conveying device consists of horizontal strips and vertical pens. The entire device is moved along a rectangular path 3a, 3b, 3c, 3d. The means for guiding and driving the conveying-device in this way are not shown and will not be described since they do not form part of the invention and are well-known in the art.

Mounted above the table 1 is a stationary frame 4 in which a shaft 5 is rotatably supported. Attached to said shaft is a holder 6, which forms a guide for a knife 7 (Figs. 1 and 4), of which the edge cooperates in the manner of scissors with the edge of a strip 8 mounted at a short distance below the holder 6 and connected to the latter at the ends only, whereby a gap is formed, through which the packing material 9, which in the present case is a web of cellophane, is supplied.

Rotatably mounted about the axis 5 is a second holder 10, which is adapted to be adjusted at a certain angle with respect to the holder 6 and to be connected with the latter by means of an adjusting screw (not shown) and a strip 11 having a curved slot. The holder 10 carries two gripping members 13, each of which is loaded by a spring 12, and a cutting die 14, the shape of which will be described hereinafter. The gripping members 13 and the cutting die 14 cooperate with a strip 15 mounted at a short distance from the holder 10 and connected with the latter at its ends only, whereby a second gap is formed, through which the cellophane is passed. The cellophane for the wrappers of the cigars is supplied in the form of a web 9 of certain breadth from a coil (not shown) and it is moved in a cylindrical surface concentric to the shaft 5. The cellophane is guided in the cylindrical surface by means of circularly bent strips 16 and 17, which are passed through the gaps formed between the holder 10 and the strip 15 and between the holder 6 and the strip 8.

It is apparent from Figs. 1, 1a and 2 that the shaft 5 is driven by an arm 18 fixed thereto, a rod 19 and a crank-arm 22 mounted on a driving shaft 21, which is driven in the direction of the arrow 20 (Fig. 1a). Both the rod 19 and the crank-arm 22 are provided with slots 23 and 24, respectively, in which the crank-pin 25 is adjustably fixed. It will be obvious that, when the driving shaft 21 is rotated, the unit consisting of the gripping members 13, the cutting die 14 and the cutting means 7, 8 is angularly reciprocated about the shaft 5 and that a variation of the length of the effective crank-arm by displacement of the crank-pin in the slot 24 will result in a variation of the angular stroke of said unit, whereas a change of the length of the active part of the rod 19 by displacement of the crank-pin in the slot 23 will effect a change of the end positions of said system.

The gripping members 13 and the knife 7 are coupled with arms 29 by means of links 27 and 28, respectively. The links 27 engage the stems 26 of the gripping members 13. The cutting die 14 is connected with its stem 30 to a link 31, which in its turn is coupled with an arm 32. The arms 29 and 32 are attached to a shaft 33, which is rotatably supported in brackets 34 of the holder 6. This shaft 33 is driven by means of an arm 35 connected thereto, a link 36 coupled with said arm 35, a lever 38 connected to the latter and rotatably supported by a stationary pivot 37 and a cam-disc 39 mounted on the driving shaft 21. The free end of said lever 38 carrying a roller 40 is held against said cam-disc by means of a spring 41. The journal connecting the arm 35 and the link 36 is adapted to describe about the shaft 33 a part of a circle, which contains the axis of the shaft 5.

The angularly reciprocating unit consisting of the gripping members 13, the cutting die 14 and the cutting means 7, 8 is controlled as follows:

In the illustrated position said unit has almost reached its right-hand end-position. When in said end-position the roller 40 moves into the recess 42 of the cam-disc 39, the arms 29 and 32 are forced downward, due to which the gripping members 13 remain in their gripping position and the cutting die 14 and the knife 6 are also forced downwards. The cutting die then makes a U-shaped cut 43 in the cellophane at a point, below which the cellophane is provided with a tearing tape 44 previously adhered to the cellophane (Fig. 3). At the same time the knife 7 cuts a sheet 9' from the web of cellophane 9. The cut 43 forms, in the region of the tearing tape 44, a lip 45 on the cellophane. The knife 7 has in its edge a recess 46, which saves the lip 45 from being cut-off during the process of cutting the sheet 9' from the web of cellophane (Fig. 4). The edge of the knife 7 has two parts, which are inclined from the recess 46 to the ends of the knife in order to assure a reliable cutting action.

When the roller 40, after having passed the recess 42 reaches the high cam 47 of the disc 39, the arms 29 and 32 are moved upward so as to lift the gripping members 13, the cutting die 14 and the knife 7. In that case the unit is made free from the cellophane, so that the latter will not be moved together with said unit. In order to prevent any movement of the cellophane in the wrong direction the cellophane is passed through a catch 48 permitting the cellophane to be moved freely in the direction of the supply but holding it when pushed in the opposite direction.

When the unit has reached its left hand end-position the roller 40 engages the low cam 49 of the disc 39. In that case the gripping members 13 are released and are forced downward by means of the springs 12 so as to hold the cellophane 9 firmly on the strip 15. During the next half revolution of the shaft 21 the unit carrying the parts 13, 14 and 7 is swung again to the right and the cellophane 9, which projects with a sheet 9' from the knife 7, is moved together therewith. During this return movement the journal between the arm 35 and the link 36 lies exactly in the axis of the shaft 5, so that the parts 13, 14 and 7 are not controlled (Figs. 1, 1a).

During the return movement of the unit carrying the parts 13, 14 and 7 the projecting sheet 9' is placed between a cigar 2a, which in the meantime is brought within reach of a wrapping-mechanism, and a part 50 of said mechanism. After the sheet 9' has been cut-off the part 50 of the wrapping-mechanism is moved downward by means of a lever 50a and a cam-disc 50b. The lever 50a is rotatably supported by the pivot 37 and the cam-disc 50b is mounted on the main shaft 21. During the downward movement of the mechanism 50 the portions of the sheet 9' projecting from both sides of the cigar are bent downward along the sides of the cigar. In order to support the cigar 2a and to prevent the projecting portions of the sheet 9' from curling up in undesired directions, a supporting finger 51 is provided, which in the manner according to Figs. 1, 5 and 6 cooperates with folding fingers 52 and 53, of which first the finger 52 lays the left-hand portion of the sheet 9' around the cigar 2a and pushes away the supporting finger 5 and thereupon the finger 53 folds the right-hand portion carrying the lip 45 of said sheet around the cigar and over the left-hand portion thereof.

After this has happened the wrapped-in cigar is brought into the position 2b and hence into the position 2c, wherein the ends of the tubular wrapper projecting from the cigar are first squeezed by fingers 54 and 55, so as to give said tubular ends an 8-shaped cross-section (Fig. 1), and thereupon are flattened and closed by means of a pair of tongs provided with heated jaws 56 and 57 (Fig. 7). The wrapped-in cigar is then placed into the position 2d, wherein the flattened ends of the wrapper are folded back and adhered by means of heated fingers 58.

For wrapping a thicker or a thinner cigar, the sheet 9 will have to be broader or narrower, respectively. To obtain this it is only necessary to make the angle enclosed between the holders 6 and 10 greater or smaller, respectively, and to vary the length of the crank-arm 22 correspondingly. How far the sheet 9' comes to lie in the right manner upon the cigar 2a in the wrapping mechanism depends on the right-hand end-position of the angularly reciprocating unit carrying the members 13, 14 and 7. It is possible to adjust this end-position by means of the active length of the rod 19. It finally depends on the adjustment of the angle enclosed between the holders 6 and 10 and on the adjustment of the crank-arm 22, how far the tearing lip 45 will protrude from the outer edge of the sheet 9'.

What we claim is:

1. A device for feeding sheets of wrapping material into a machine for wrapping said sheets around elongated articles which comprises, in combination, means defining an arcuate channel for receiving a web of the wrapping material, web advancing means adapted to engage and grip said web intermittently, cutting means comprising cooperating cutting edges adapted to cut off a sheet of predetermined length from said web, said advancing means and said cutting means forming a unit mounted for swinging movement along the web lying in said arcuate path about an axis at the center of curvature of said arcuate path, said advancing means and cutting means thereby being mounted for movement along said web in unison, means being provided for adjustably setting the relative spacing between said advancing means and said cutting means along said arcuate path.

2. A device for feeding sheets of wrapping material into a machine for wrapping said sheets around elongated articles which comprises, in combination, means defining an arcuate channel for receiving a web of the wrapping material, web advancing means adapted to engage and grip said web intermittently, cutting means comprising cooperating cutting edges adapted to cut off a sheet of predetermined length from said web, said advancing means and said cutting means forming a unit mounted for swinging movement about an axis at the center of curvature of said arcuate path, said advancing means and said cutting means thereby being mounted for movement along said web in unison, and means for adjusting the stroke of said unit, said last-named means comprising a rotatably supported shaft carrying said unit, a radially extending arm attached to said shaft, a crank-shaft driven in one direction only, a radially adjustable crank-pin forming part of said crank-shaft and a rod of adjustable length interconnecting said arm and said crank-pin.

3. A device for feeding sheets of wrapping material into a machine for wrapping said sheets around elongated articles which comprises, in combination, means defining an arcuate channel for receiving a web of the wrapping material, web-advancing means comprising grippers adapted to engage and grip said web intermittently, cutting means comprising a member providing a cutting edge and a reciprocating member cooperating with said cutting edge adapted to cut off a sheet of predetermined length from said web, said advancing means and said cutting means forming a unit mounted as a unit for swinging movement about an axis at the center of curvature of said arcuate path, springs for urging the grippers of said advancing means into their gripping position, a multiple lever system, arms including a driving arm forming said lever system, said system being swingably attached to said unit, said grippers and said reciprocating cutting member being connected to said arms, and a driving rod connected to said driving arm at a point adapted to describe, about the axis of swinging of said lever system, a part of a circle containing the axis of swinging of said unit.

4. A device for feeding sheets of wrapping material into a machine for wrapping said sheets around elongated articles which comprises, in combination, means defining an arcuate channel for receiving a web of the wrapping material, web advancing means adapted to engage and grip said web intermittently, cutting means comprising a member providing a cutting edge and a reciprocating knife member cooperating with said cutting edge, said reciprocating knife member being adapted to reciprocate intermittently to cut off a sheet of predetermined length from said web, said advancing means and said cutting means forming a unit mounted as a unit for swinging movement about an axis at the center of curvature of said arcuate path, a cutting-die for periodically making a U-shaped cut in the web at a point which is crossed by the knife after the web has been advanced one step by the advancing means, the cutting edge of the knife member extending from said U-shaped cut towards the side-edges of the web but having a recess to receive the lip of packing material enclosed by said U-shaped cut, and said cutting-die being mounted for swinging about the axis of said arcuate path.

5. A device for feeding sheets of wrapping material into a machine for wrapping said sheets around elongated articles which comprises, in combination, means defining an arcuate channel for receiving a web of the wrapping material, web advancing means comprising grippers adapted to engage and grip said web intermittently, cutting means comprising members having cooperating cutting edges adapted to cut off a sheet of predetermined length from said web, said advancing means and said cutting means forming a unit mounted as a unit for swinging movement about an axis at the center of curvature of said arcuate path, a cutting-die for intermittently making a U-shaped cut in the web, said die being connected to said unit for swinging movement therewith, and said die being mounted for angular adjustment about said axis with respect to the cutting means.

6. A device for feeding sheets of wrapping material into a machine for wrapping said sheets around elongated articles which comprises, in combination, means defining an arcuate channel for receiving a web of the wrapping material, web advancing means comprising grippers adapted to engage and grip said web intermittently, cutting means comprising members having cooperating cutting edges adapted to cut off a sheet of predetermined length from said web, a cutting-die for intermittently making a U-shaped cut in the web, a first holder supporting and guiding said die and the grippers of the advancing means, and a second holder supporting and guiding the cutting members, both holders being rigidly but adjustably connected to one another and forming a unit, said unit being mounted for swinging about an axis at the center of curvature of said arcuate path.

References Cited in the file of this patent

UNITED STATES PATENTS

| | | |
|---|---|---|
| 362,746 | Hicks | May 10, 1887 |
| 394,772 | Jarboe | Dec. 18, 1888 |
| 836,020 | Ecaubert | Nov. 13, 1906 |
| 1,016,067 | Fischer | Jan. 30, 1912 |
| 1,213,275 | Schroeder | Jan. 23, 1917 |
| 2,136,876 | Chaveas | Nov. 15, 1938 |
| 2,163,754 | Jones | June 27, 1939 |
| 2,619,177 | Praturlon | Nov. 25, 1952 |